United States Patent [19]

Fuchs

[11] 4,055,090
[45] Oct. 25, 1977

[54] SENSOR

[76] Inventor: Werner Karl Heinz Fuchs, Sedlmayrstr. 14, 8 Munich 19, Germany

[21] Appl. No.: 670,350

[22] Filed: June 27, 1975

Related U.S. Application Data

[63] Continuation-in-part of Ser. No. 412,685, Nov. 5, 1973, abandoned, which is a continuation-in-part of Ser. No. 185,130, Sept. 30, 1971, abandoned.

[30] Foreign Application Priority Data

Oct. 5, 1970  Germany .......................... 2048802
July 6, 1973  Germany .......................... 2334493

[51] Int. Cl.² ........................................... G01P 15/00
[52] U.S. Cl. ..................................... 73/510; 73/517 A
[58] Field of Search ............... 73/510, 514, 516 R, 73/517 A; 303/21 B, 21 BB, 21 CG, 24 A, 24 F

[56] References Cited

U.S. PATENT DOCUMENTS

| 2,505,636 | 4/1950 | Carter | 73/517 A |
|---|---|---|---|
| 2,992,859 | 7/1961 | Sampietro | 73/511 X |
| 3,292,977 | 12/1966 | Williams | 73/510 X |
| 3,311,423 | 3/1967 | Horvath | 73/510 X |
| 3,322,471 | 5/1967 | Faiver et al. | 303/21 CG |
| 3,402,973 | 9/1968 | Scibbe | 73/510 X |

FOREIGN PATENT DOCUMENTS 1,459,065  10/1966  France .............................. 73/517 A Primary Examiner—James J. Gill

[57] ABSTRACT

The sensor described in the specification and which compares the rotary wheel deceleration with the linear vehicle deceleration, comprises a mass which is subject to both decelerations and whose movement is checked by an electrical sensing means rotating with the shaft. This sensing means provides data signals in the case of an excessive difference between the two decelerations without the need of a mechanical contact between the sensing means and the mass. The description further shows sensors which measure completely non-contacting and which transmit the data signals without the use of slip rings. These sensors can also measure the angular wheel deceleration and simultaneously the transversal deceleration of a vehicle.

18 Claims, 17 Drawing Figures

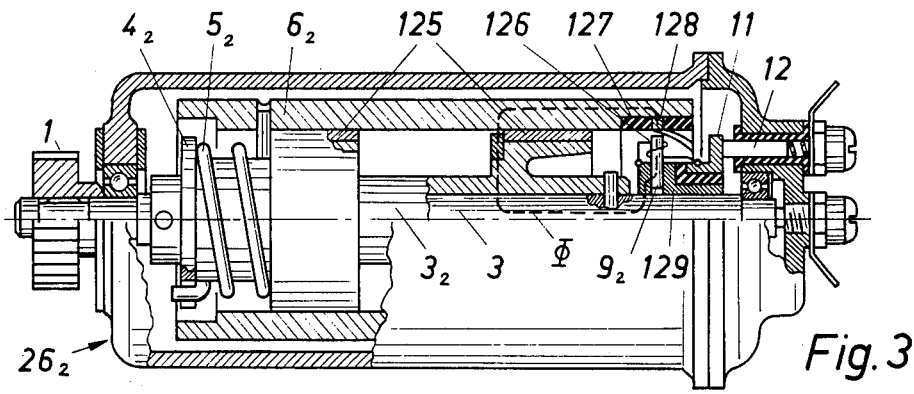
Fig. 3
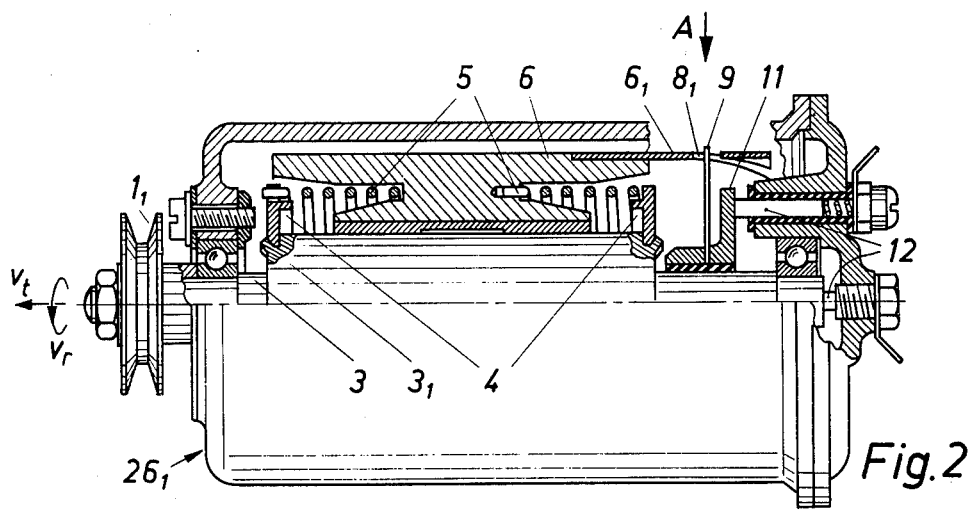
Fig. 2
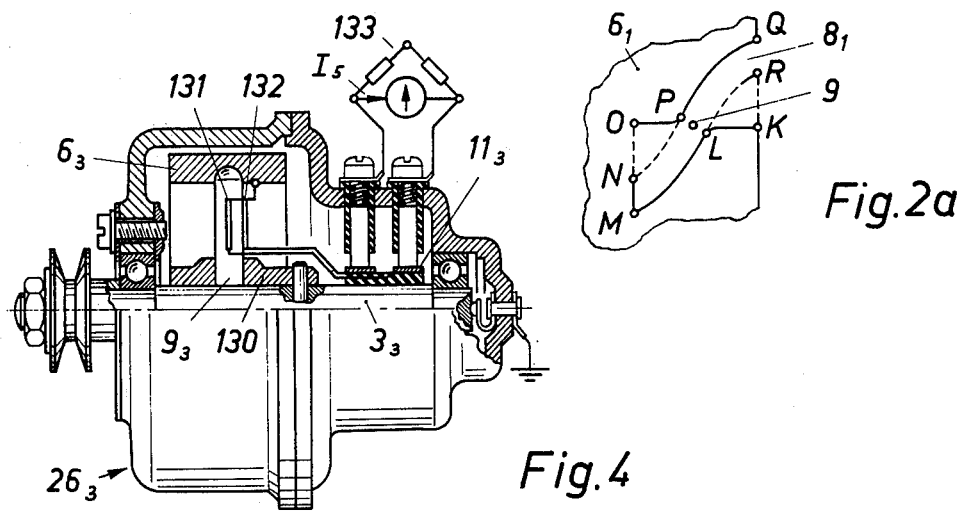
Fig. 2a
Fig. 4

Fig. 6a
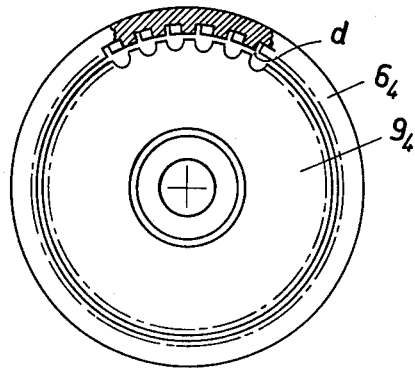
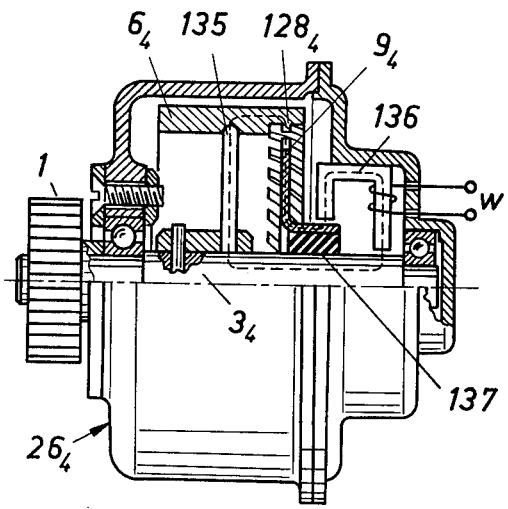
Fig. 6
Fig. 8
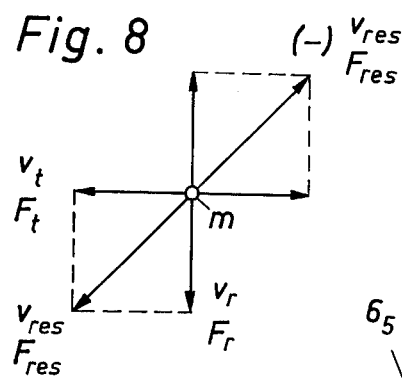
Fig. 7
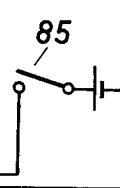

SENSOR

CROSS-REFERENCE TO RELATED APPLICATIONS

This application is a continuation-in-part of my prior copending application Ser. No. 412,685, filed Nov. 5, 1973, for A SENSOR, MORE PARTICULARLY FOR ANTI-LOCKING SYSTEMS FOR VEHICLES, now abandoned, which was a continuation in part of application Ser. No. 185,130 filed Sept. 30, 1971, now abandoned.

The present invention includes electronic sensors with completely non-contacting measuring systems free from wear.

BACKGROUND OF THE INVENTION

The present invention relates to sensors which were developed for anti-locking and slip warning systems for vehicles. However, they can also be used for other aims. The sensors compare by electrical means the wheel periphery deceleration with the vehicle linear deceleration, and in the case of an excessive deviation between the decelerations, the sensors provide electrical measured value. In the same way the sensors measure and control the ratio between the wheel periphery acceleration and the vehicle linear acceleration. Simultaneously they can measure and indicate the components of the decelerations and accelerations separately. The sensors can also measure the transversal deceleration of a vehicle and the wheel rotary deceleration when the sensor is arranged so that its axis runs parallel to the wheel axle.

Anti-locking systems for vehicles require reliable sensors in order to achieve greater safety when braking a vehicle. The aim of the sensors is to control the wheel rotary motion and give commands when the brake pressure should be reduced, held constant, or increased.

The disadvantages of the rotational deceleration sensors are that in the case of the regulation or control of anti-locking systems they do not take into account the differing road conditions, that they only react in the case of a certain prefixed and pronounced rotational deceleration and respond late particularly in the case of smooth road surfaces. With such sensors it is also not possible to avoid wheel locking with certainty, because their limit of response must correspond to a wheel rotation deceleration of approximately 10 m/s$^2$ having regard to road conditions in which good engagement is obtained. However, if for example on a smooth road surface one brakes the wheels slightly below the limit of response, locking of the wheels may occur before the vehicle itsself comes to a standstill, which is decelerated perhaps only at the rate of 2 m/s$^2$.

A comparison measurement with respect to deceleration between the wheel periphery and the vehicle linear deceleration makes it possible to avoid the disadvantages described.

SUMMARY OF INVENTION

An object of the present invention is to provide a new, useful, and very advantageous sensor which can carry out such comparison measurements. On its shaft the sensor has a resiliently mounted mass which is subject to the wheel rotary deceleration and the vehicle linear deceleration. Thus, in response to the deceleration of wheel rotation, the mass is rotatably displaceable relative to the shaft and — independently of this — axially displaceable in response to vehicle linear deceleration. Fixed on the shaft is an electric sensing means which observes and controls the movement of said mass. Contact between the mass and said sensing means is therefore not necessary.

The advantage of all the described sensors is that this type of scanning is no load or hindrance to the measuring system. In comparison with other sensors, a higher sensitivity of response and accuracy can be achieved which despite differing road surface conditions makes possible a more sensitive, reliable and certain regulation or control of anti-locking systems. Furthrmore, these sensors can be constructed smaller, lighter, and produced economically. The measuring system of these sensors can be constructed with a greater natural frequency, which is important when measuring acceleration or deceleration. In addition, a greater rate of control can be achieved. Further advantages, especially of the electronic sensors, are that they have completely non-contacting sensing systems, which can be produced very economically. Examples of application for such sensors are shown in copending U.S. patent applications:

Ser. No. 614,198 filed Sept. 17, 1975 and
Ser. No. 484,603 filed July 1, 1974.

An object of the present invention is to provide electronic sensors with inductive sensing systems. One of these sensors is shown with a completely non-contacting sensing system, and without slip rings.

Another object of the present invention is to rovide an electronic sensor with a completely non-contacting photoelectric system of scanning.

A further object of the present invention is to provide a sensor with resistance strain gauges. A sensor with piezoelectric crystals is also shown.

A still further object of the present invention is to provide a sensor with an electric conductive sensing element (contact).

Other objects, features, and advantages of the present invention become apparent from the subsequent description, from the disclosure teaching of the principles of the invention, and from the appended claims taken in connection with the accompanying drawings.

BRIEF DESCRIPTION OF THE DRAWINGS

The invention is represented in the following embodiments and shown in:

FIG. 2 a further embodiment of a sensor 26$_1$ like the one in FIG. 1 but with a modified curved track and without an overload clutch, which is not necessary for its function.

FIG. 2a a view looking in the direction A of the curved track 8$_1$ of the sensor 26$_1$.

FIG. 3 a sensor with an inductive sensing system.

FIG. 4 a sensor with resistance strain gauges.

FIG. 6 an electronic sensor with an inductive sensing system without slip rings.

FIG. 6a a partial view of the sensor in FIG. 6 from the side.

FIG. 7 an electronic sensor with photoelectric scanning and without slip rings.

FIG. 8 a diagram for the movement of the mass m of a sensor.

DESCRIPTION OF SENSOR 26

Figure 1:
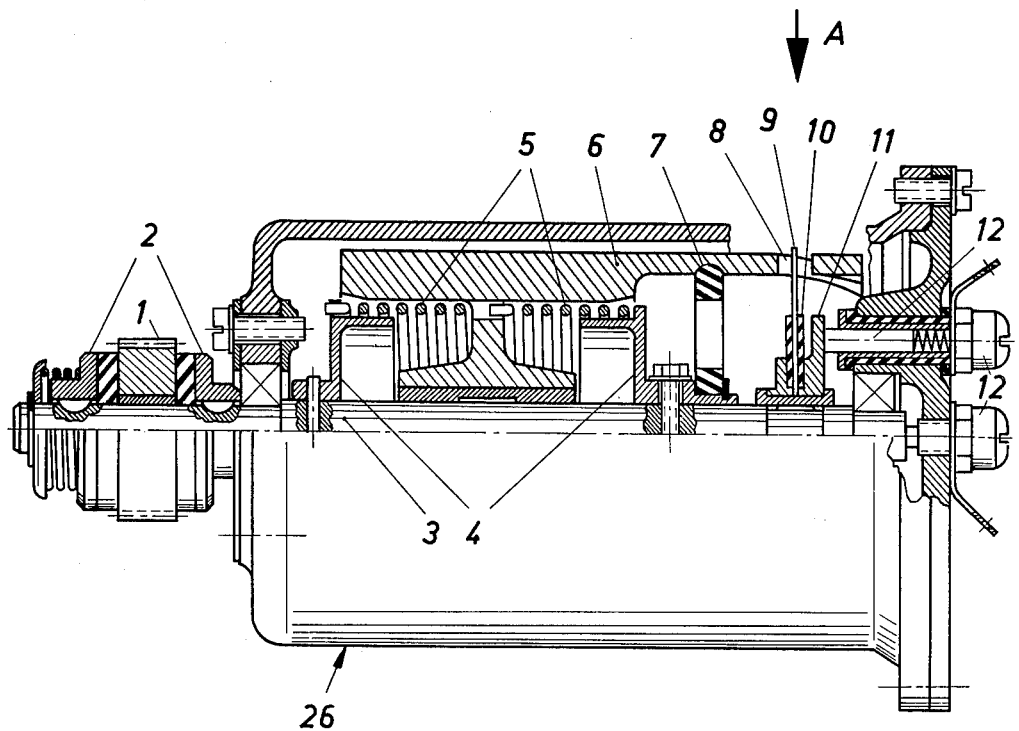
FIG. 1 a sensor 26 with an electric conductive sensing element (contact).

In FIG. 1 is a measuring sensor disclosed which can, for example, control an anti-locking system for vehicles.

The sensor 26 has a longitudinal axis, and is mounted in the vehicle so that its axis runs parallel to the longitudinal axis of the vehicle. The sensor includes a housing in which a shaft 3 is rotatable mounted upon bearings. The shaft 3 is rotatably driven by a gear 1 mounted upon the shaft by an overload clutch 2. The overload clutch 2 serves only as a protection for the sensor and is not important for its action principle. The gear 1 is driven by a brakable vehicle (rear) wheel, or from the vehicle drive shaft, not shown, wherein the shaft 3 will be rotated in dependence to the rotation of a vehicle (rear) wheel, or the drive shaft thereof. Thus, the mounting orientation of the sensor, and its drive, permits the sensor mass to be axially displaceable in response to vehicle linear deceleration and — independently of this —rotatably displaceable in response to deceleration of wheel rotation.

Figure 1A:
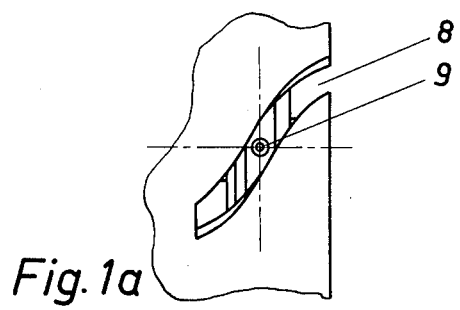
FIG. 1a a view looking in the direction A of the recess 8 of the sensor 26.

A mass 6 of cylindrical configuration is resiliently mounted about the shaft 3 by coil springs 5, which are pretensioned for rotation and pressure to produce a predetermined resilient mounting of the mass 6 upon the shaft 3. In this manner the mass 6 can be axially and rotatively displaced relative to the shaft 3. Two discs 4 fixed on the shaft 3 serve as mounting for the mass 6 and the springs 5. A damping means 7 can be provided for the spring mass system. On the shaft 3 is attached an electric sensing means or sensing element which observes and controls the movement of the mass 6 relative to the shaft 3. With this principle, contact between the mass 6 and said sensing means is not necessary. On the mass 6 there is a marking in the form of a curved track (control contour) which, for example, is a recess 8 and runs in the same direction in which the mass 6 moves relative to the electric sensing means when the ratio of wheel periphery deceleration to vehicle linear deceleration is constant. The electric sensing means is, for example, an electric conductive contact 9 which is damped by means of a sleeve 10 and extends into the recess 8. The contact 9 is attached to the shaft 3 and does not normally come into contact with the mass 6 (see FIG. 1 and 1a). The air in the recess 8 serves as an insulating material for the electrical contact 9 which is connected to a slip ring 11. The slip ring 11 is attached to the shaft 3 and isolated from it. The brushes 12 serve for the supply and removal of current.

MANNER OF OPERATION

With normal braking with little slip the wheel rotation and linear vehicle deceleration are in a certain ratio with respect to each other. The mass 6 which is subject to both forms of deceleration moves with its recess 8 in such a manner that the contact 9 and an anti-locking device are not operated. The normal braking is thus not influenced. If, on the other hand, in consequence of too strong a braking operation, an inadmissible degree of wheel slipping or tendency to lock occurs, then the mass 6 deviates from its normal path of movement and contacts the contact 9. As a result current can flow via the brushes 12 of the sensor 26 and, for example, a solenoid valve of an anti-locking system can be operated so that the braking pressure drops until the desired ratio between the wheel rotation and linear vehicle deceleration has been restored and as a result the contact 9 is opened.

Remark: A mechanical contact between the electric (feeler) contact 9 and the flanks of the curved track 8 would be unnecessary, for example, if more electric voltage was used so that electric sparks could flash over if there were a change in the spacing between the contact 9 and the mass 6.

FIG. 2 shows a sensor $26_1$ which is constructed similar to sensor 26 which is described above. With a modified and exaggeratedly represented curved track $8_1$, sensor $26_1$ can perform additional control functions. An example of application of this is shown in the copending patent application U.S. Ser. No. 484,603 filed July 1, 1974.

In the embodiment according to FIG. 2 a measurement sensor $26_1$ is mounted with its longitudinal axis parallel to the longitudinal axis of the vehicle. A shaft 3, with a belt pulley $1_1$ fixed on it is journaled by means of two ball bearings in the housing of the sensor $26_1$. Two discs 4 are fixed on the shaft 3 or on a bush $3_1$ which is mounted on the shaft. On these discs 4 and a mass 6, there are two springs 5 attached, which are prestressed as regards turning and pressure. As a result, the spring-anchored mass 6, provided with a bearing bush, can, under the influence of inertial forces, be moved axially and — independently of this — also relative to the shaft 3 in the direction of rotation. An electric sensing element 9 or contact feeler checking the movement of the mass 6 possesses a mechanical and an electrically conducting connection with a slip ring 11 which is mounted on the shaft 3 and is insulated from it electrically. The brushes 12 serve for the supply and removal of current. An electrically conducting ring $6_1$ provided with a curved track $8_1$, or a ring sector, is connected with the mass 6 in a fixed manner. A view of this ring $6_1$ in the direction A looking towards the curved track $8_1$ is shown in FIG. 2a.

If for driving the sensor $26_1$ a belt is selected it is advantageous to make use of a smooth belt, that is to say a belt without teeth, which is pretensioned in a defined manner. Owing to the frictional or non-positive engagement between the belt and the belt pulley $1_1$ an overload clutch need not be employed for driving the sensor 26 in order to protect it.

MANNER OF OPERATION

The arrows shown in FIG. 2 indicate the direction of rotation $v_r$ of the sensor $26_1$ in the case of the forward direction of travel $v_t$. In the case of normal braking with little slip — or also in the case of acceleration — the mass 6 subjected to the rotary and linear inertial forces moves with its ring $6_1$ in relation to the feeler 9 in such a manner that the latter does not make contact with the curved tracks NPQ or MLR (FIG. 2a). Normal braking is not influenced in this respect. If, however, owing to excessively forceful braking a tendency for wheel lock occurs, which leads to an excessive change in the deceleration of the wheel relative to the linear deceleration of the vehicle, the feeler 9 makes contact with the track P-Q. As a result current can now flow through the sensor $26_1$ and the braking pressure can be reduced by means of an opened solenoid valve until the wheel speed of rotation, which had sunk previously to an excessive extent, increases again. Consequently the feeler 9 moves clear of the track P-Q. It could now make contact with the oppositely placed track L-R, which in this case is, however, insulated from the feeler 9, or can for example be set back in the form of the track L-K in order in special cases to suppress signals which could occur in the case of excessive wheel acceleration. As soon as the correct ratio between the wheel speed and the vehicle linear movement has been restored, the connection between the feeler 9 and the tracks or ring $6_1$ is broken. In the case of smooth or slippery roads the sensor responds even in the case of slight rotational decelerations which are smaller than in the case with roads on which good wheel engagement is obtained and on which higher linear vehicle deceleration values can be obtained.

The tracks located in FIG. 2a to the left of the feeler 9, which are omitted in the case of the sensor $26_2$ (FIG. 3) apply correspondingly for braking in the case of traveling backwards.

As can be seen the sensor 26 can indicate wheel slip in the case of acceleration of a vehicle as well as deceleration. In the case of excessive forward rotational acceleration the feeler 9 touches the track M-L and in the case of excessive backward rotary acceleration contact is made with the track P-Q.

Although in the embodiment shown the feeler 9 is connected with the shaft 3 and senses relative movement of the mass 6, it is also possible to attach the feeler 9 on the mass 6 and to sense relative movement of the shaft 3 in a corresponding manner or to connect a shaft 3 by means of a feeler 9 with a mass 6 directly (FIG. 4).

The bearing friction of a mass 6, which can be used for damping the spring-mass system, could be reduced, if necessary, by a curved track-like ball bearing arrangement, for example.

In accordance with a particularly simple construction in accordance with the invention the flanks of a curved track are constituted, for example, of shaped strip or wire. If for this purpose a resistance material is used, a feeler 9 could provide information additionally as regards the linear vehicle deceleration and thus corresponding with the tapping point. This measured magnitude could serve to bring about automatic matching or adjustment of the speed of rotation of and electric motor and thus the frequency of a pulsator so as to correspond with the road conditions obtained.

FIG. 3 shows an embodiment of a sensor $26_2$ functioning in accordance with the principle of a sliding response threshold. The manner of operation of this very simple and robustly constructed sensor $26_2$ is similar to that of the sensor 26 and $26_1$.

Figure 12:
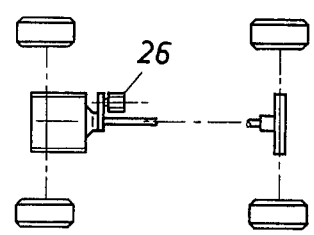
FIG. 12 a sensor 26 which, for example, is driven by the drive shaft of a vehicle.

The fitting of the equipment in the vehicle is carried out in such a manner that the longitudinal axis of the sensor runs parallel to the longitudinal axis of the vehicle (see FIG. 12).

In the housing of the sensor $26_2$ a shaft 3 is journaled in a rotary manner with two ball bearings and on the shaft a gear wheel 1 is fixed by means of an elastic ring. On the shaft 3 there is a bush $3_2$ connected with it in a fixed manner. This bush $3_2$ carries pressed-on bearing rings 125 for the mass $6_2$, which can be displaced in an axial direction and in the direction of rotation freely against the force of only one spring $5_2$. One end of the spring $5_2$ is connected via a disc $4_2$ with the shaft 3 in a fixed manner and the other end is connected with the mass $6_2$. With the mass $6_2$ a ring 127 of magnetically non-conducting material is connected. An embedded curved track 128 is in the ring 127 and made of magnetically conducting (ferromagnetic) material is in close connection with the mass $6_2$. Ferromagnetic materials are also used for the construction of the shaft 3, the bush $3_2$ and the mass $6_2$. The curved track 128 can have any desired form (FIG. 2a) and consists of sintered ferromagnetic powder and of bent sheet metal or wire parts. A particularly advantageous and economical construction of the ring 127 involves cutting it from a tube, which has been made from helically shaped flat wire coil with plastics material injection moulded around it. For sensing the mass movement or the movement of the curved track 128 use is made of an inductive feeler $9_2$. This feeler $9_2$ consisting for example of a rod-shaped soft iron core is pressed into an iron bush 129 fixed on the shaft 3. On the same bush 129 a slip ring 11, insulated from the bush 129, is arranged. A coil 126 arranged about the feeler $9_2$ is connected on the one hand electrically with the slip ring 11 and on the other hand with the bush 129 or the shaft 3 respectively. The brushes 12 serve for the supply and removal of current. For protection of the spring $5_2$ against overloading and for limiting an excessive improper movement of the mass $6_2$ it is possible to provide damping abutments or buffers between the bush $3_2$ and the mass $6_2$ as a matter of course.

In the case of normal low-slip braking the wheel rotation and vehicle linear decelerations have a certain ratio between them. The mass $6_2$, which is subject to the two forms of deceleration, moves with its curved track 128 against the spring $5_2$ which is subject to rotation and pressure, in relation to the feeler $9_2$ so that the latter does not send a message indicating an excessive deviation. The magnetic flux $\Phi$ maintains a characteristic which is practically unchanged and can for example be in accordance with the one shown in broken lines.

If, on the other hand, owing to excessively violent braking an excessive difference occurs between wheel deceleration and vehicle linear deceleration the spring anchored mass $6_2$ with its curved track 128 moves excessively far from the feeler $9_2$ and as a result the magnetic resistance, the magnetic flux $\Phi$ in the iron circuit and the inductance of the coil 126 are changed, the change being evaluated in a conventional manner to provide a control cammand.

A further possibility of embodiment of a sensor 26 can be one in which a feeler 9 has resistance strain gauges, so that an excessive departure from a curved track can be measured in the form of a change in resistance.

FIG. 4 shows a very simple example of this type: The feeler $9_3$ connected with a shaft $3_3$ or with a hub 130 fixed on it, and a mass $6_3$ is in this case constructed, as it were, as a spoke of a (flywheel) mass $6_3$. Such feelers $9_3$ or spokes can here for example serve simultaneously as springs. On one feeler $9_3$ two resistance strain gauges 131 and 132, offset for example by 90° with respect to each other, are attached, which are connected electrically on the one hand with the mass $6_3$ and on the other hand with two slip rings $11_3$ arranged in an insulated manner on the shaft $3_3$. The drawing shows preferably semi-conductor electrical strain gauges $131,, 132$ as resistors in a conventional Wheatstone bridge circuit.

If on braking the rotational wheel deceleration matches the vehicle linear deceleration, the mass $6_3$ attached to the feelers $9_3$ and to the spokes respectively is moved in accordance with a curved track so that the change in resistance of the strain gauges 131, 132 occurs equally and does not lead to any disturbance in the equilibrium of the measuring bridge 133. If, however, in the case of a tendency for wheel lock to occur the wheel rotational deceleration is greater than the longitudinal deceleration of the vehicle, the resistance of one strain gauge 131 is accordingly changed to a greater extent than that of the other 132. Accordingly a bridge current $I_5$ flows which in a conventional manner can be used for controlling an anti-locking system.

Preferably strain gauges 131, 132 are attached to several feelers $9_3$ and so connected that forces other than the forces to be measured are mutually compensated. A damping of the spring mass system could be carried out in this case by embedding, spraying on or coating at least one of the feelers $9_3$ or of the spokes with a rubber- or plastic-like mass.

Figure 5:
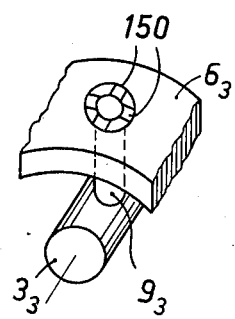
FIG. 5 a partial view of a sensor with piezoelectric crystals.

FIG. 5 shows a partial view of a sensor 26 with 4 piezoelectric crystals. The measuring system of this sensor is constructed similar to that of the sensor in FIG. 4. It has at least one spoke $9_3$ between the mass $6_3$ and the shaft $3_3$, and piezoelectric crystals 150 which are attached between the mass $6_3$ and the spoke $9_3$ (or between the spoke $9_3$ and the shaft $3_3$ — not shown) and offset for example by approximately 90° with respect to each other in order to control the movement of the mass $6_3$ relative to the shaft $3_3$.

Particularly advantageous in the case of these sensors 26 is their very simple construction, the robustness and the relatively high natural frequency of its measuring system.

Although several sensors 26 have slip rings 11, the transfer of the measured data can also be carried out in a conventional manner without slip rings. Such sensors 26 are suitable in accordance with dimensioning and damping of their spring mass system for displacement, speed and acceleration comparison measurements and can be used for any anti-locking systems.

FIG. 6 shows an electronic sensor with an inductive sensing system without slip rings. The inductive sensor $26_4$ functions in principle like other sensors described above: A round mass (fly wheel) $6_4$ is attached to the shaft $3_4$ by means of several resilient spokes 135. The mass $6_4$ has —instead of a curved track — helical teeth $128_4$. The spokes 135, which have a round cross-sectional area, are magnetically conductive bound to the mass $6_4$ as well as to the shaft $3_4$. The teeth $128_4$ on the mass $6_4$ and on the toothed gear $9_4$ are spaced close together as shown in FIG. 6a. They make it possible for the magnetic reluctance in iron always to remain constant. The toothed gear $9_4$ serves as a sensing element. It is made of soft iron or of some other suitable ferromagnetic material (e. g. dust iron core) and it is fastened to the shaft $3_4$ by a magnetic non-conductive ring 137. A u-shaped iron core 136, which has at least one coil w, is attached to the housing of the sensor $26_4$ in such as way so that the iron core has small and constant air gaps to the toothed gear $9_4$ and to the shaft $3_4$.

Manner of operation: When the coil w is electrically energized the resulting magnetic flux follows the pattern shown by the dottel line. The magnetic reluctance in this circuit remains constant, if on applying the brakes the right relation between linear vehicle deceleration and angular wheel deceleration is maintained. If this relation should change inadmissibly the air gap d and the magnetic reluctance between the teeth of the tooth gear $9_4$ and the teeth of the mass $6_4$ would change also. Consequently, the inductance of the coil w, which can be measured, also changes. By this means, anti-locking systems for vehicles can be conveniently controlled.

FIG. 7 shows an electronic sensor $26_5$ with photoelectric (opto-electronic) scanning and likewise without slip rings. Construction: Here there is also a round mass (fly wheel) $6_5$ fastened on a shaft $3_5$ by means of resilient spokes 135. The spokes 135 form the springs of the spring-mass-system. For damping this system, the spokes 135, for example, can be surrounded by a damping means 138. There is a rigid tubule 139 (scanning tubule), which serves as an optical sensing element, mounted on the shaft $3_5$. In this tubule 139 there are two light pipes side by side which have one end aimed at a marking $128_5$ on the mass $6_5$ and whose other ends are arranged staggered. One light pipe 140, for example, goes through a centric hole in the shaft $3_5$. The second light pipe 141 lies eccentrically staggered in a groove of the same shaft $3_5$. On the mass $6_5$ there is a black mark $128_5$ on a reflecting background instead of a curved track. A light source has been provided so that by means of a round aperture 146 the light pipe 141, which is arranged eccentrically on the shaft $3_5$, can be illuminated. A lamp 143 in a box 142 can serve as a light source or simply a round liminary 145 (filament) can be used, which is mounted on the housing of the sensor. The other light pipe 140 is pointed at a photoamplifier or a photocell 144. Instead of the light pipes, a mirror 147, which is fixed on the shaft $3_5$, can be used for optical scanning.

Operation: When the brake light switch 85 is operated, the light source 143, 145 illuminates the light pipe 141 through the ground aperture 146. However the light will not be reflected by the black mark $128_5$ on the mass $6_5$. But if the brakes are applied too sharply and the mass $6_5$ cannot move in the right direction relative to the optical sensing element (feeler) 139, then the light from the light pipe 141 will be reflected into the other light pipe 140 and the photocell 144 will be exposed. With these signals anti-locking systems can be very easily and reliably controlled.

FIG. 8 shows a diagram on the mass m of a sensor. As is apparent, the direction of the curved track $v_{res}$ for the movement of the mass m of a sensor 26 is determined by the chosen ratio of the peripheral speed $v_r$ to the linear velocity $v_t$ of the mass. Thus occurs the ratio of the inertial forces $F_r/F_t$, which in the case of vehicle deceleration or acceleration effect the mass m which is shown here as a dot.

Figure 9:
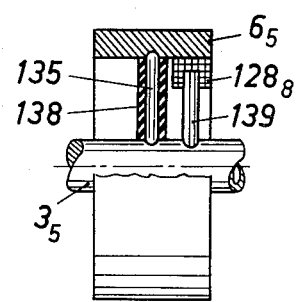
FIG. 9 a raster (scanning field) which is attached as a marking on the mass of a sensor 26.

FIG. 9 shows a raster (scanning field) which is attached as a marking on the mass $6_5$ of a sensor 26 which can be constructed similar to the one in FIG. 7. The raster $128_8$ can be made of photoelectric material (photosensitive means), for example, so that the direction of movement and the position of the mass $6_5$ relative to the optical sensing means 139 will be recognized and transmitted as information (measured value); whereby in addition the components of the vehicle linear deceleration and the wheel angular deceleration can also be measured separately. The opticl sensing means 139, which is fixed on the shaft $3_5$, serves to scan the raster $128_8$.

I wish it to be understood that I do not desire to be limited to the exact details of construction shown and described, for obvious modifications will occur to a person skilled in the art.

Figure 10A:
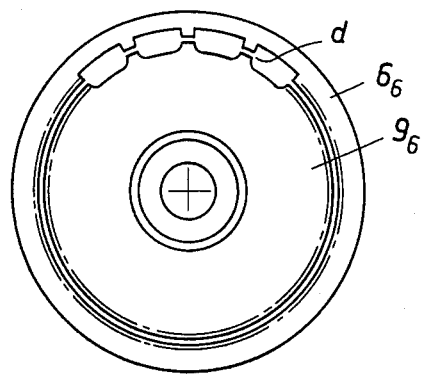
FIG. 10a a partial view of the sensor in FIG. 10 from the side.
Figure 10:
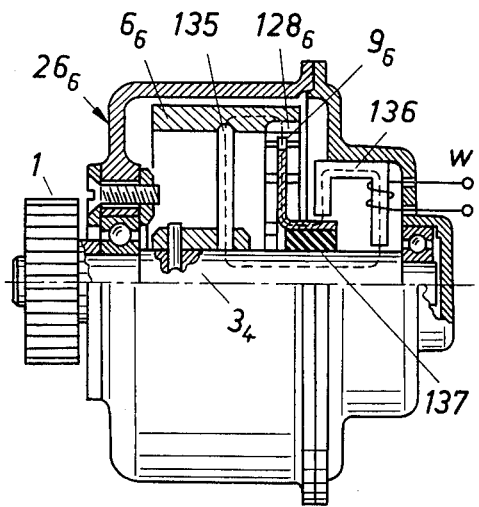
FIG. 10 an electronic sensor with an inductive sensing system without slip rings for measuring the angular deceleration and the angular acceleration.

FIG. 10 shows an inductive sensor $26_6$ with straight teeth $128_6$ on the mass $6_6$ for measuring the angular deceleration and acceleration. It can be arranged in any desired position in a vehicle or on a wheel, just as the sensor shown in FIG. 6.

Figures 11, 11A:
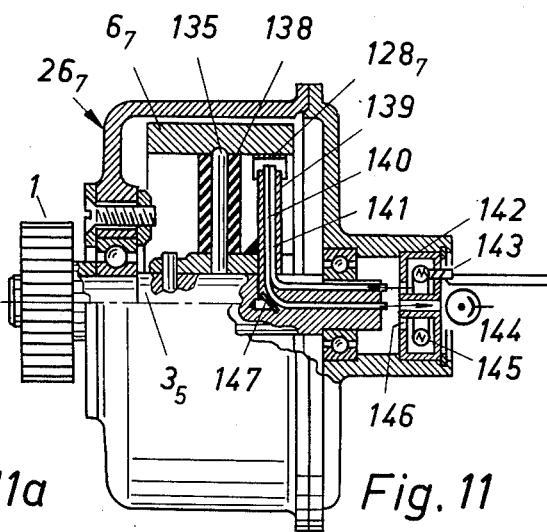
FIG. 11 an electronic sensor with photoelectric (optoelectronic) scanning without slip rings for measuring the angular deceleration and the angular acceleration.
FIG. 11a a partial view of the electronic sensor shown in FIG. 11 looking from the sensing element 139 (feeler) in the direction of the optical marking on the mass.

FIG. 11 shows a photoelectric sensor $26_7$. The marking $128_7$ on the mass $6_7$ runs in a circumferential direction and has a different optical structure in various shades (black-white) in order to be able to measure the angle of twist of the mass $6_7$ relative to the shaft $3_5$. According to the degree of this angle of twist, a photocell 144 can be more or less strongly exposed.

I claim as my invention:

1. A sensor which measures and automatically compares the wheel angular deceleration with the vehicle linear deceleration on a vehicle with wheels, comprising:
   a housing,
   a shaft journaled in the latter and arranged parallel to the longitudinal axis of the vehicle and connected with at least one of the vehicle wheels in order to be driven proportionally to the wheel speed of rotation,
   a mass, which can move in an axial direction and independently of this also in a rotary direction on the shaft,
   elastic means interposed between said shaft and said mass elastically supporting said mass upon said shaft for relative movement thereto,
   magnetic conductive helical teeth on said mass extending in the same direction in which the mass freely moves relative to the shaft when the ratio of wheel periphery deceleration to the vehicle linear deceleration remains constant, whereby as a result of the wheel angular deceleration the mass twists relative to the shaft and — independently of the twisting — there is an axial displacement as a result of the vehicle linear deceleration,
   a toothed gear which is fixed on said shaft and magnetically isolated from it in order to serve as a non-contacting inductive sensing means,
   an iron core attached to said housing in order to conduct a magnetic flux through the toothed gear and the teeth of the mass, and
   a coil on the iron core in order to measure the magnetic reluctance between the toothed gear and the mass and provide the measured value when the ratio of angular deceleration to linear deceleration exceeds a predetrmined quantity.

2. A sensor in accordance with claim 1, wherein the improvement is characterized in that several spokes are available for the mounting of said mass on the shaft in order to serve as resilient elastic means, and in that the spokes are made of magnetically conducting material and are magnetically conductive connected to said teeth on the mass and also to the shaft.

3. A sensor which measures and automatically compares the wheel angular deceleration with the vehicle linear deceleration on a vehicle with wheels, comprising:
   a housing,
   a shaft journaled in the latter and arranged parallel to the longitudinal axis of the vehicle and connected with at least one of the vehicle wheels in order to be driven proportionally to the wheel speed of rotation,
   a mass, which can move in an axial direction and independently of this also in a rotary direction on the shaft,
   elastic means interposed between said shaft and said mass elastically supporting said mass upon said shaft for relative movement thereto,
   an optical marking attached to said mass to mark the direction in which the mass freely moves relative to the shaft when the ratio of wheel periphery deceleration to the vehicle linear deceleration remains constant, whereby as a result of the wheel angular deceleration the mass twists relative to the shaft and — independently of the twisting — there is an axial displacement as a result of the vehicle linear deceleration,
   an optically sensing element fixed on the shaft,
   two light pipes in said sensing element which have one end pointed at said marking and whose other ends are arranged staggered,
   a light source fixed on said housing in order to send light into one of said light pipes, and
   a photocell in order to receive light from said second light pipe when the ratio of angular deceleration to linear deceleration exceeds a predetermined quantity.

4. A sensor in accordance with claim 3, whereby one of the said light pipes lays centrally in the hollow shaft and the second light pipe lays eccentrically in the groove of the same shaft, and whereby said light source and the photocell are arranged concentric to each other on the housing of the sensor and are aimed at the light pipes in order to send light into one of the light pipes and receive it out of the other one.

5. A sensor as in claim 3 further including damping means in which the elastic means are imbedded in order to dampen the spring - mass system.

6. A sensor which measures the angular deceleration of a wheel, comprising:
   a housing,
   a shaft journaled in the latter and connected with the wheel in order to be driven proportionally to the wheel speed of rotation,
   a mass on the shaft which can move in a rotary direction relative to the shaft,
   elastic means interposed between said shaft and said mass for relative movement thereto,
   an optical marking attached to said mass in a circumferential direction and in the same direction shows a different structure,
   a photoelectric sensing element fixed on the shaft,
   two light pipes in said sensing element which have one end pointed at said marking and whose other ends are arranged staggered,
   a light source fixed on said housing in order to send light into one of said light pipes, and
   a photocell in order to receive light from the second light pipe, whereby the luminous intensity depends on the size of the angle of twist between the mass and the shaft.

7. A sensor for measuring the angular deceleration of a wheel, comprising:
a housing,
a shaft journaled in the latter and connected with the wheel in order to be driven proportionally to the wheel speed of rotation,
a mass on the shaft which can move in a rotary direction relative to the shaft,
spokes made of resiliently elastic and magnetically conductive material for mounting the mass on the shaft,
teeth on the periphery of said mass which are magnetically conductive connected to the shaft by the spokes,
a toothed gear fixed on the shaft and magnetically isolated from it in order to serve as a non-contacting sensing means and to discern the position of the mass,
an iron core attached to said housing in order to conduct a magnetic flux through the toothed gear and the teeth of the mass, and
a coil on the iron core in order to measure the magnetic reluctance between the toothed gear and the mass.

8. A sensor which measures and automatically compares the wheel angular deceleration with the vehicle linear deceleration on a vehicle with wheels, comprising:
a housing,
a shaft journalled in the latter and arranged parallel to the longitudinal axis of the vehicle and connected with at least one of the vehicle wheels in order to be driven proportionally to the wheel speed of rotation,
a mass, which can move in an axial direction and independently of this also in a rotary direction on the shaft,
elastic means interposed between said shaft and said mass, elastically supporting said mass upon said shaft for relative movement thereto,
an electrically conductive curved track on said mass which extends in the same direction in which the mass freely moves relative to the shaft when the ratio of wheel periphery deceleration to the vehicle linear deceleration remains constant, whereby as a result of the wheel angular deceleration the mass twists relative to the shaft and — independently of the twisting — there is an axial displacement as a result of the vehicle linear deceleration,
an electrical contact means fixed to said shaft and mounted to contact said curved track when the difference between the linear and angular deceleration exceeds a preselected threshold,
a slip ring attached to said shaft and electrically isolated from it and electrically connected to said contact means, and
brushes for the slip ring.

9. A sensor in accordance with claim 8 wherein strip means are provided that are made of electric conductive resistance material and attached to said mass so that they extend in the direction of said curved track in order to form the same.

10. A sensor which measures and automatically compares the wheel angular deceleration with the vehicle linear deceleration on a vehicle with wheels, comprising:
a housing,
a shaft journalled in the latter and arranged parallel to the longitudinal axis of the vehicle and connected with at least one of the vehicle wheels in order to be driven proportionally to the wheel speed of rotation,
a mass, which can move in an axial direction and independently of this also in a rotary direction on the shaft,
elastic means interposed between said shaft and said mass elastically supporting said mass upon said shaft for relative movement thereto,
an electrically conductive curved track on said mass which extends in the same direction in which the mass freely moves relative to the shaft when the ratio of wheel periphery deceleration to the vehicle linear deceleration remains constant, whereby as a result of the wheel angular deceleration the mass twists relative to the shaft and - independently of the twisting - there is an axial displacement as a result of the vehicle linear deceleration,
an electrical contact means fixed to said shaft and mounted to contact said curved track when the difference between the linear and angular deceleration exceeds a preselected threshold, and
means for transmitting the electric data signals from the rotating contact means to the housing of the sensor.

11. A sensor which measures and automatically compares the angular wheel deceleration with the linear vehicle deceleration on a vehicle with wheels, comprising:
a housing,
a shaft journalled in the latter and arranged parallel to the longitudinal axis of the vehicle and connected with at least one of the vehicle wheels in order to be driven proportionally to the wheel speed of rotation,
a mass, which can move in an axial direction and independently of this also in a rotary direction on the shaft,
elastic means interposed between said shaft and said mass elastically supporting said mass upon said shaft for relative movement thereto,
a curved track consisting of ferromagnetic material and connected with said means, whereby the direction of said curved track is determined by the movement direction of the mass when at normal angular wheel deceleration the mass twists in relative movement to said shaft and when owing to the linear vehicle deceleration the mass moves in an axial direction in relative movement to the shaft,
an inductive feeler mounted upon said shaft for sensing the position of said curved track, and
a coil for said feeler producing an electric signal upon relative displacement between said track and said feeler.

12. A sensor which measures and automatically compares the angular wheel deceleration with the linear vehicle deceleration on a vehicle with wheels, comprising:
a housing,
a shaft journalled in the latter and arranged parallel to the longitudinal axis of the vehicle and connected with at least one of the vehicle wheels in order to be driven proportionally to the wheel speed of rotation, a mass, which can move in an axial direction and independently of this also in a rotary direction on the shaft, at least one feeler arranged between the shaft and the mass and connected to both, at least two strain gauge means on the feeler arranged in an offset manner in relation to each other in order to measure in one strain gauge means the twisting of the mass and with the second strain gauge means its linear displacement, slip rings attached to the shaft and insulated electrically from it and connected with the strain gauge means, and brushes for the slip rings, and with the sensor the deceleration in wheel rotation and the linear vehicle deceleration can be measured and compared with each other.

13. A sensor which measures and automatically compares the angular wheel deceleration with the linear vehicle deceleration on a vehicle with wheels, comprising:

a housing, a shaft journalled in the latter and arranged parallel to the longitudinal axis of the vehicle and connected with at least one of the vehicle wheels in order to be driven proportionally to the wheel speed of rotation, a mass, which can move in an axial direction and independently of this also in a rotary direction on the shaft, and at least two strain gauges interposed between said shaft and said mass, one of said strain gauges indicating relative axial displacement between said shaft and said mass, and the other strain gauge indicating relative rotative movement between said shaft and said mass.

14. A sensor as in claim 13, wherein said strain gauge means includes piezoelectric means.

15. A sensor which measures and automatically compares the wheel angular deceleration with the vehicle linear deceleration on a vehicle with wheels, comprising:

a housing, a shaft journaled in the latter and arranged parallel to the longitudinal axis of the vehicle and connected with at least one of the vehicle wheels in order to be driven proportionally to the wheel speed of rotation, a mass, at least one elastic spoke by means of which the mass is attached on the shaft so that the mass is movable in an axial direction and, independently of this, also in a rotary direction relative to the shaft, an optical marking on the mass, an optical sensing means fixed on said shaft in order to scan said marking and thus monitor the movement of the mass relative to the shaft, a light source for said sensing means and a photocell for receiving the light from the optical marking, when the ratio of angular deceleration to linear deceleration exceeds a predetermined quantity.

16. A sensor as in claim 5, wherein said light source is mounted on said housing and wherein said optical sensing means includes a mirror fixed on the shaft so that the light source illuminates said marking on the mass.

17. A sensor as in claim 15, wherein said optical marking includes a photoelectric scanning raster means, wherein said photocell is mounted on said housing and wherein said optical sensing means includes means for transmitting the measured value from the raster means to said photocell.

18. A sensor which measures and automatically compares the wheel angular deceleration with the vehicle deceleration on a vehicle with wheels, comprising:

a housing, a shaft journaled in the latter and arranged parallel to an axis of the vehicle and connected with at least one of the vehicle wheels in order to be driven proportionally to the wheel speed of rotation.

a mass, a spring means for elastically supporting said mass upon said shaft for relative movement thereto, a marking attached to said mass to mark the direction in which the mass freely moves relative to the shaft when the ratio of wheel periphery deceleration to the vehicle deceleration remains constant, whereby as a result of the wheel angular deceleration the mass twists relative to the shaft and — independently of the twisting — there is an axial displacement as a result of the vehicle deceleration, and a non-contacting sensing means fixed to said shaft for sensing the position of said marking.

* * * * *